United States Patent [19]
Corcoran

[11] Patent Number: 5,199,749
[45] Date of Patent: Apr. 6, 1993

[54] METAL SADDLE CLAMP WITH LOOPED CABLE FASTENER

[75] Inventor: Daniel P. Corcoran, Grandville, Mich.

[73] Assignee: Corcoran Industries Inc., Grandville, Mich.

[21] Appl. No.: 941,386

[22] Filed: Sep. 8, 1992

[51] Int. Cl.⁵ ............................................. F16L 41/08
[52] U.S. Cl. ..................................... 285/197; 285/189
[58] Field of Search ............... 285/197, 198, 199, 189; 137/316, 317, 318; 24/278, 129 R, 136 B, 481

[56] References Cited

U.S. PATENT DOCUMENTS

| | | | |
|---|---|---|---|
| 152,184 | 6/1874 | Sperring | 138/318 |
| 1,563,406 | 12/1925 | Skinner | 285/197 |
| 1,908,821 | 5/1933 | Cornell, Jr. . | |
| 2,221,934 | 11/1940 | Ferris . | |
| 2,421,596 | 6/1947 | Bruce . | |
| 2,884,265 | 4/1959 | Boughton | 285/197 |
| 3,183,023 | 5/1965 | Morrison . | |
| 3,298,717 | 1/1967 | Rothwell et al. | 285/197 |
| 3,471,176 | 10/1969 | Gilchrist | 285/197 |
| 3,967,839 | 7/1976 | Dunmire | 285/199 |
| 4,179,141 | 12/1979 | Newman . | |

FOREIGN PATENT DOCUMENTS

| | | | |
|---|---|---|---|
| 390634 | 8/1965 | Switzerland | 285/197 |
| 2181203 | 4/1987 | United Kingdom | 285/197 |

Primary Examiner—Eric K. Nicholson
Attorney, Agent, or Firm—Robert L. McKellar

[57] ABSTRACT

What is disclosed herein is a novel metal coupling in combination with a fastening means to couple the metal coupling to a pipe surface, in that, the coupling is situated over a formed aperture in a pipe, a cable is looped over a supporting prong on the coupling, and a bolt, fastened to the cable, is tightened to draw the cable down onto the surface of a pipe, which in turn draws the metal coupling down onto the pipe in a secure manner.

6 Claims, 2 Drawing Sheets

FIG 3
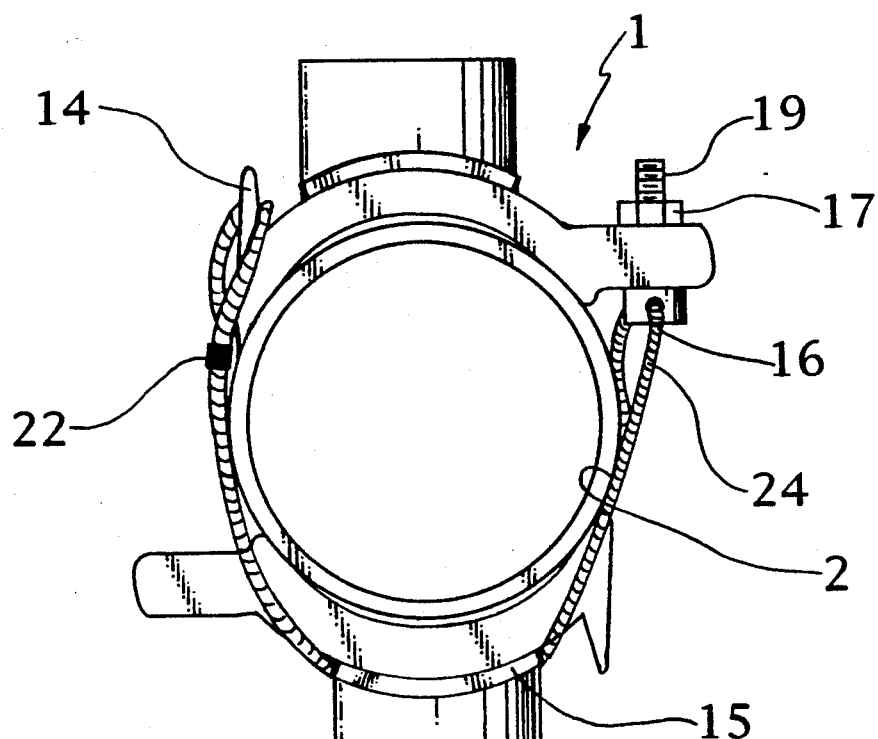
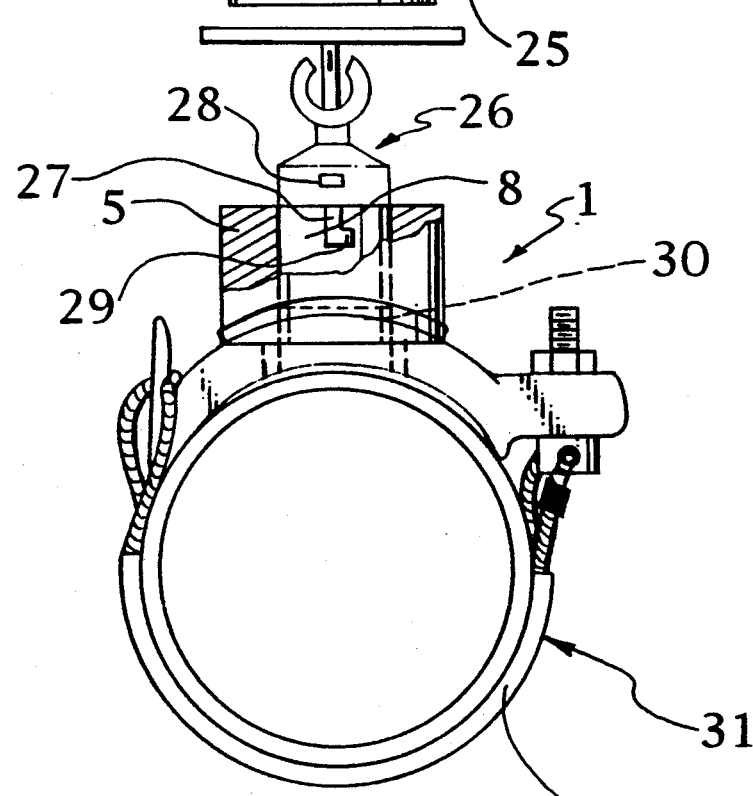
FIG 4

METAL SADDLE CLAMP WITH LOOPED CABLE FASTENER

BACKGROUND OF THE INVENTION

This invention deals with a novel means for providing a branch point in a pipe or conduit. More specifically, this invention deals with a means of providing a leak-proof attachment to a pipe used for fluid transport.

Several devices have been disclosed in the prior art. Such devices are shown, for example, in U.S. Pat. No. 1,908,821, issued May 16, 1933 to E. S. Cornell Jr.; U.S. Pat. No. 2,221,934, issued Nov. 19, 1940 to R. G. Ferris; U.S. Pat. No. 2,421,596, issued Jun. 3, 1947 to A. W. Bruce et al.; U.S. Pat. No. 3,183,023, issued May 11, 1965 to B. E. Morrison; and U.S. Pat. No. 4,179,141, issued Dec. 18, 1979 to John W. Newman.

None of these devices disclose a device wherein the device can be attached to the pipe with the convenience of cable while providing the needed strengths for maintaining the coupling to the pipe in a leakproof fashion. The device of this invention allows the installer to be more efficient owing to the fact that just simple mechanical connections have to be made, in that the coupling is situated over a formed aperture in a pipe, a cable is looped over the supporting prong on the coupling, and a bolt tightened to draw the cable down onto the surface of a pipe, which in turn draws the metal coupling down onto the pipe in a secure manner.

It is believed by the inventor herein that such a device provides the efficiency of cabling but at the same time retains the required strengths to maintain the metal coupling on the surface of the pipe and prevent leaks therefrom.

SUMMARY OF THE INVENTION

The instant invention therefore comprises a novel metal coupling and a fastening means therefor in combination for use in obtaining a leakproof connection in piping. The connector has a centrally located bore with a retaining means to allow the insertion of a branch pipe or a sprinkler head into it, and it is designed such that one can use a gasket in the coupling if desired. The length of the cable used to secure the metal coupling when the bolt and threaded fastener are drawn together, is predetermined such that when encircling a given diameter of pipe, the small movement of the threaded fastener to draw down on the bolt, to which the cable is attached, is sufficient to provide a tight fit and a secure coupling.

THE INVENTION

Thus, the invention disclosed herein comprises a pipe connector wherein the pipe connector is comprised of a combination of a metal coupling and a fastening means and optionally a gasket for the metal coupling against the outer surface of the pipe. The metal coupling consists essentially of a circular unitary saddle-shaped member which is dimensioned to at least partly surround a pipe to cover an aperture in the wall of the pipe. The saddle-shaped member has a long axis parallel to a line traversing across the pipe perpendicular to the long length of the pipe. The saddle-shaped member has an inner face which conforms substantially to the outside curvature of the pipe. It also has a rounded upper surface which is surmounted by a circular housing. The housing has through it's center, a central bore which extends through the saddle-shaped member and some distance below the line of curvature of the inner face. The bore is internally threaded for a portion of its length from the top of the housing downwardly. The inner face has an annular recessed area in its under side to house and retain a gasket. The recessed area is centrally disposed relative to the bore. The saddle-shaped member has a lug integrally mounted on its upper outside surface and the lug is essentially horizontally aligned with the long axis of the saddle-shaped member and has an aperture through it. The saddle-shaped member has integrally mounted on its upper outside surface opposite the lug, a vertical prong. The saddle-shaped member has mounted on the outside edge of its upper surface two partial side rails, wherein each said rail is vertical and parallel with the vertical axis of the housing and is located between the lug and the prong.

The fastening means comprises a cable and a bolt wherein the bolt is the type which has a head and a threaded shaft. The threaded shaft passes through an aperture of the lug and is surmounted by a threadable fastener. The cable is a cable without end in that it is one continuous loop. The cable is attached to the head of the bolt such that there is formed two separate leads of the same cable wherein the loop configuration is formed. Both leads of the cable pass under and around the pipe and loop over the prong such that when the threaded fastener is tightened down on the bolt, the bolt is pulled through the aperture of the lug whereupon the cable is pulled tightly against the outside surface of the pipe and the coupling to couple the pipe coupling to the pipe.

BRIEF DESCRIPTION OF THE DRAWINGS

FIG. 3 shows a pipe which has two of the metal couplings mounted opposite to each other thereon.

FIG. 4 is an end view of a metal coupling of this invention in which the circular housing is shown in a fragmentary cross section to illustrate a unique locking mechanism for sprinkler heads useful in the coupling of the invention and to show the back plate configuration.

DESCRIPTION OF THE PREFERRED EMBODIMENTS

Figure 1:
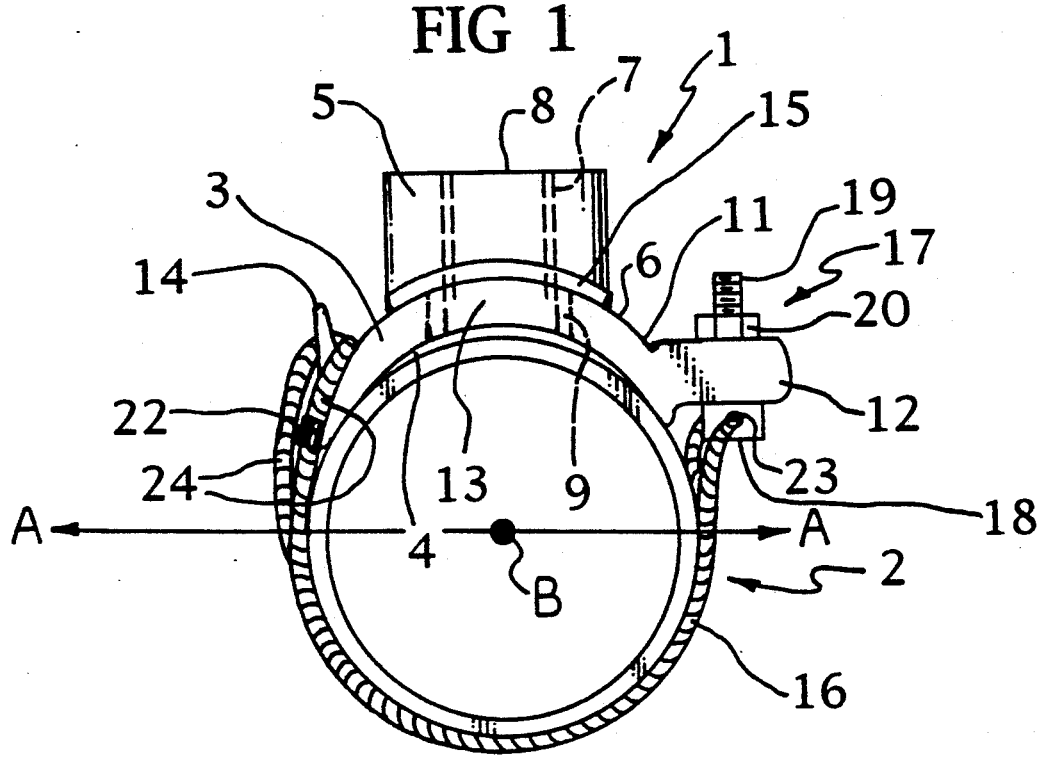
FIG. 1 is a an end view of a device of this invention in place on a pipe.

Referring now to the drawings in which like numbers indicate like-parts or pieces, there is shown in FIG. 1 a side view of the metal coupling 1 of this device mounted on a pipe 2 over an opening in the pipe, with the fastening means in place. It should be noted that the lower part of the metal coupling has a circular saddle-shaped member 3 which has an inner face 4 which is designed to conform to the exterior surface of the pipe or conduit on which it is used. This metal coupling 1 is manufactured from some suitable material such as steel or the like.

The metal coupling 1 has a centrally located housing 5 on its upper surface 6 which may threaded on it's interior and for purposes of illustration, the threads 7 (shown in phantom) extend from the top of the housing 5 to about ⅜ of the way down into a central bore 8. Another embodiment of the fastening mechanism of this portion of the device is discussed infra. The central bore 8 extends on through the saddle-shaped member 3 with the central bore 8 extending a small distance beyond the inner face 4 of the saddle-shaped member 3 through a hole 13 in the pipe (shown in phantom) in order to form a recessed resting spot 9 (shown in phantom) for a gasket 10 not shown in this Figure. The central bore 8 for purposes of illustration, is pipe screw threaded for the purpose of insertion of threaded pipes or sprinkler heads and the like into the central bore 8.

Also shown in FIG. 1 is a line A—A which indicates for purposes of illustration, the long axis of the metal coupling 1, which is a cut across the long axis of the pipe and perpendicular to the long axis of the pipe. The long axis of the pipe is shown in FIG. 1 at point B and is to be considered to be running the long length of the pipe, and away from the viewer.

There is located on the upper outside surface 11 of the saddle-shaped member 3, a lug 12 which is integrally mounted such that it is essentially horizontally aligned by its top surface with the uppermost surface at point 6 of the saddle-shaped member 3. The lug 12 has an aperture through it to receive a bolt shaft 19. The saddle-shaped member 3 also has integrally mounted on its upper outside surfacee 11, opposite the lug 12, a vertical prong 14. In addition, the saddle-shaped member 3 has mounted on its upper surface at 6, on the outside surface 11, a pair of partial side rails 15. Only one such rail 15 is shown in FIG. 1. It should be noted that the side rails 15 are located between the prong 14 and the lug 12 and are designated as being "partial" because of the fact that they do not extend entirely from the prong 14 to the lug 12. This is because when the metal coupling 1 is used in the configuration of FIG. 3, that is when the metal coupling 1 is used in conjunction with another like metal coupling 1 on essentially opposite sides of the pipe 2, the cable leads 24 can pass inside the side rails 15 and extend around the pipe 2 and pass over the prong 14 and thus bind the second coupling 25 without the use of an additional fastening means. In order to secure the metal couplings 1 and 25 with confidence, the rails 15 should be essentially vertical with and parallel to the housing 5 on the saddle-shaped member 3.

The fastening means of this device comprises a cable 16 and a bolt 17. The bolt 17 is comprised of a head 18 and a threaded shaft 19. The bolt head 18 can be of any design or configuration such that it can be held tightly by a wrench or the like during tightening of the bolt 17 in the coupling process described infra. Thus, the bolt head 18 can be of a hexagonal shape, square shape, or can be a set screw type, just a long as one can immoblize the bolt 17 during the tightening and untightening thereof.

The bolt 17 is fitted with a threaded fastener 20 which is capable of being tightened down on the threaded shaft 19. The threaded fastener 20 can be of any design, as long as it is capable of being tightened. Thus, for purposes of this invention, the threaded fastener 20 can be a hexagonal nut which may be chamfered at one end or not, a flanged hexagonal nut, cap nut, square nut, fluted nut, circular back nut, screwdriver nut, a capstan nut, locking nut, wing nut, or the like.

The cable 16 is a cable without an end which means that it is a continuous loop of cable. The cable 16 can be made continuous by fastening it together at it's ends. The ends of the cable 16 can be welded, knotted, twisted, or crimped together, such as by a bolt which has a head with traverse holes, or by a connector such as the crimpping device shown at 22. The means of connecting the ends of the cable 16 requires only that the cable 16 will not become separated during use.

When the cable 16 is connected together in this manner, it forms a continuous loop. The cable 16, is fastened to the bolt head 18 in such a manner that it cannot slip away from the bolt 17. In FIG. 1, it is shown as being fastened to the bolt head 18 by passing the unconnected cable 16 through the hole 23 before the cable 16 is connected together, however, it can also be welded to the bolt head or otherwise secured.

In use as a combination, the metal coupling 1 is placed upon the surface of the pipe 2 such that it covers the aperture 13, which has been pre-formed in the pipe, with the saddle-shaped member 3 resting on the outer surface of the pipe 2. The fastening means, which has been constructed prior to use, comprises the bolt 17 with the looped cable 16 already in place. If a gasket is to be used, the gasket is inserted into the recessed area 9 prior to surmounting the pipe 2 with the metal coupling 1. After the metal coupling 1 is in place, the cable 16 is looped over the vertical prong 14, passed under and around the pipe 2, and the bolt shaft 19 is passed through the aperture of the lug 12, and fitted with a threaded fastener 17. The threaded fastener 17 is then tightened down on the bolt shaft 19, the bolt 17 is pulled tightly through the aperture of the lug 12 such that the bolt head 18 meets the lug 12, whereupon the cable 16 is pulled tightly against the outside surface of the pipe 2 to couple the metal coupling 1 to the pipe 2.

Figure 2:
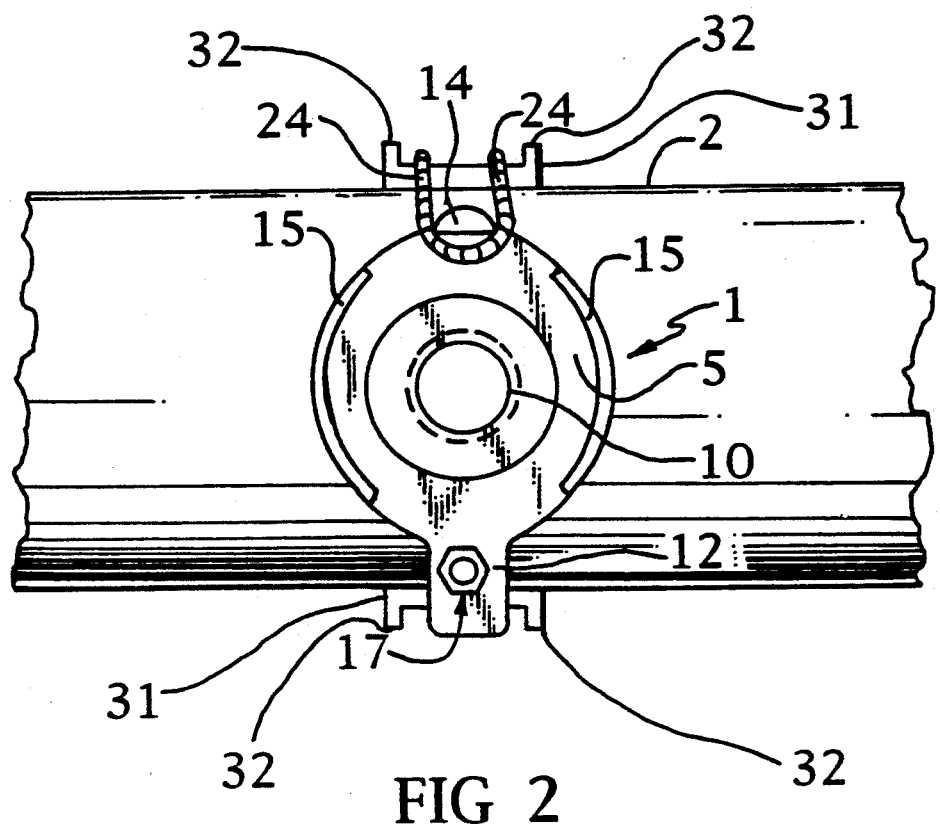
FIG. 2 is a top view of a device of this invention in place on a pipe.

FIG. 2 is a top view of a device of this invention in place on a pipe and shows the configuration of the looped cable 16 as it passes over the vertical prong 14 and down around the pipe 2. It should be noted that one of the reasons that this device is novel is the fact that instead of one single cable or band passing from one side of the coupling to the other side of the coupling, such as in the prior art U-bolt design, there are two such cables, which doubles, or more than doubles the holding power of the metal coupling 1. When a U-bolt of the prior art is used to maintain the metal coupling on the surface of the pipe, the U-bolt captures less than about 10% of the outside surface of the pipe. Thus, they tend to concentrate the forces at a small point on the surface of the pipe opposite the coupling. With the device of the instant invention, the cable, in conjunction with the metal coupling of the invention, covers almost 100% of the outside surface of the pipe.

It is believed that the spacing of the cable leads 24 in this manner prevents the cable from collapsing the pipe because of the fact that the forces are spread out over the pipe surface rather than being concentrated in a small spot on the surface of the pipe 2 at a point opposite the coupling. This is especially notable when one realizes that this device is useful on thin walled pipe as well as thick walled pipe. On a 1 inch steel pipe, the United Laboratories/Mutual Standard specification is for the fastening means to have the ability to withstand 460 foot pounds of pressure. That is because, at 500 to 600 foot pounds, pipe distortion sets in which is the incipient stages of collapse of the pipe. Standard U-bolts used for maintaining metal couplings on the surfaces of pipes distort and twist and eventually crush pipe until the fitting leaks or the fitting pops out of the pipe, at or exceeding 500 to 600 foot pounds of pressure. The device of the instant invention has been tested on 1 inch steel pipe by the inventor herein and it will carry 1000 foot pounds without distortion, twist or crushing of the pipe. Further, the metal coupling of the instant invention weighs only 35% or less of the weight of the standard couplings in use today.

As indicated earlier, FIG. 3 shows a pipe 2 which has two of the metal couplings mounted opposite to each other thereon, that is, metal coupling 1 and a second metal coupling 25.

It should be noted that only one fastening means is required to hold both of the metal couplings 1 and 25 on the surface of the pipe 2, and further, it should be noted that the cable leads 22 still cover almost 100% of the surface of the pipe 2 in conjunction with the metal couplings 1 and 25.

Thus there is shown the bolt 19, with the threaded fastener 17, the cable 16 separating into two leads 22, a crimping fastener 24 for the cable 16, side rail 15 that is in use as shown in this configuration, and the vertical prong 14 over which the cable is looped.

In this configuration, when the threaded fastener 17 is drawn down onto the bolt 17 and compressed against the lug 12, the cable 16 bonds both the metal coupling 1 and the metal coupling 25 to the surface of the pipe 2 without the consequent use of an additional fastening means for coupling 25.

FIG. 4 is an end view of a metal coupling of this invention mounted on the surface of a pipe 2 with a fragmented cross-sectional view of the circular housing 5 of the metal coupling 1. The purpose of this view is to illustrate a further embodiment of the means for receiving and holding a sprinkler head 26 or another piece of pipe as a branch point in the pipeline and to show the back plate 30 as it is used in this invention. With regard to the sprinkler head, there is shown an L-shaped notch 27 which receives a stud 28 which is mounted on the base of a commercial sprinkler head 26 such that when the sprinkler head 26 is inserted into the opening 8 in the circular housing 5, pushed to the bottom of the notch 27 and twisted so as to move the stud 28 into the foot 29 of the L-shaped notch 27, the sprinkler head 26 is locked into the circular housing 5. The sprinkler head 26 can be easily removed by reversing the above described process. It is sometimes desirable to utilize a gasket 30 (in phantom) at the base end of the sprinkler head 26 to eliminate leaking.

With regard to the back plate 31, there is shown in FIG. 4, a back plate 31, which has a semi-circular configuration such that the innerface of the back plate 31 fits against and conforms substantially to the outer surface of the pipe 2. The back plate 31 when in use, just lays against the outer surface of the pipe 2 and is held in place by the cable 16 when the entire coupling 1 is in place and secured. The back plate 31 further has a channel configuration as can be observed from FIG. 2, where the side walls 32 are shown with the cable 16 therebetween. One function of the back plate 31 is to provide an alignment of the cable 16 as it passes beneath the pipe 2, but moreover, the main function of the back plate 31 is to prevent the crushing of thin wall pipe on which the device of this invention is used. It is believed by the inventor herein, that the back plate 31 distributes the forces of the cable 16 over a larger surface of the pipe 2 as the cable 16 is drawn tight to couple the coupling 1 to the pipe surface. Thus, the back plate 31 is an optional part of the instant invention and would generally be used in applications where thin walled pipe is to be used.

The building of piping systems and the installation of the metal couplings of this invention is quick, efficient, less wasteful and inexpensive. Further, there is a significant weight savings on the installed pipe system.

What is claimed is:

1. A pipe connector, said pipe connector in combination comprising a metal coupling and a fastening means, said metal coupling comprising a circular unitary saddle-shaped member, said saddle-shaped member being dimensioned to at least partly surround a pipe to cover an aperture in the wall of said pipe wherein said saddle-shaped member has a long axis parallel to a line traversing across the pipe; said saddle-shaped member having an inner face which conforms substantially to the outside curvature of said pipe; an essentially rounded upper surface having surmounted thereon a circular housing, said housing having through its center, a central bore which extends through the saddle-shaped member and some distance below the line of curveture of the inner face; said bore being internally configured to accomodate a fastening means; said inner face, having an annular recessed area in its under side to house and retain a gasket, said recessed area being centrally disposed relative to the bore;

said saddle-shaped member having a lug integrally mounted on its upper outside surface, said lug being essentially horizontally aligned with the long axis of the saddle-shaped-member and having an aperture therethrough; said saddle-shaped member having integrally mounted on its upper outside surface opposite the lug, a vertical prong; said saddle-shaped member having mounted on the outside edge of it's upper surface two partial side rails, each said rail being vertical with and parallel to the housing and being located between the lug and the prong thereof;

said fastening means comprising a cable and a bolt, said bolt having a head and a threaded shaft, the threaded shaft passing through the aperture of the lug and being surmounted by a threaded fastener; said cable being a cable without end and being attached to the head of said bolt such that there is formed two separate leads of the same cable which form a loop, wherein both of the leads pass under and around said pipe and loop over the prong such that when the threaded fastener is tightened down on the bolt, the cable is held in position by the prong, the bolt is pulled through the aperture of the lug whereupon the cable is pulled tightly against the outside surface of the pipe to couple the pipe coupling to the pipe.

2. The connector as claimed in claim 1 wherein the internal configuration of the circular housing is threads.

3. The connector as claimed in claim 1 wherein the internal configuration of the circular housing is an L-shaped notch for accomodating a stud.

4. A method of obtaining a leak-proof metal pipe connection which method consists essentially of the following steps:

(I) forming an aperture in a pipe wall;
(II) surmounting the aperture with a pipe connector, said pipe connector in combination comprising a metal coupling and a fastening means, said metal coupling comprising a circular unitary saddle-shaped member, said saddle-shaped member being dimensioned to at least partly surround a pipe to cover an aperture in the wall of said pipe wherein said saddle shaped member has a long axis parallel to a line traversing across the pipe; said saddle-shaped member has an inner face which conforms substantially to the outside curvature of said pipe; an essentially rounded upper surface having surmounted therein a circular housing, said housing having through its center, a central bore which extends through the saddle-shaped member and some distance below the line of curveture of the inner face; said bore being internally configured to accomodate a fastening means; said inner face, having an annular recessed area in its under side to house and retain a gasket, said recessed area being centrally disposed relative to the bore; said saddle-shaped member having a lug integrally mounted on its upper outside surface, said lug being essentially horizontally aligned with the long axis of the saddle-shaped member and having an aperture therethrough; said saddle-shaped member having integrally mounted on its upper outside edge opposite the lug, a vertical prong; said saddle-shaped member having mounted on the outside edge of its upper surface two partial side rails, each said rail being vertical with and parallel to the housing and being located between the lug and the prong thereof; said fastening means comprising a cable and a bolt, said bolt having a head and a threaded shaft, the threaded shaft passing through the aperture of the lug and being surmounted by a threaded fastener; said cable being a cable without end and being attached to the head of said bolt such that there is formed two separate leads of the same cable which form a loop;

(III) placing the loop over the prong to secure the cable;

(IV) tightening the threaded fastener down on the bolt wherein the bolt is pulled through the aperture of the lug whereupon the cable is pulled tightly against the outside surface of the pipe and pipe coupling to couple the pipe coupling to the pipe.

5. A method as claimed in claim 4 wherein a back plate is inserted between the cable and the pipe surface prior to step (IV).

6. A pipe connector, said pipe connector in combination comprising a metal coupling and a fastening means of claim 1 in further combination with a back plate.

* * * * *